United States Patent [19]
Yanagawa

[11] 3,764,129
[45] Oct. 9, 1973

[54] POWER TRANSMITTING AND ZERO POSITION RESTORING DEVICE

[75] Inventor: Nobuyuki Yanagawa, Kanagawa-ken, Japan

[73] Assignee: Ricoh Co., Tokyo, Japan

[22] Filed: Aug. 11, 1971

[21] Appl. No.: 170,745

[30] Foreign Application Priority Data
Aug. 17, 1970 Japan................................ 45/71431

[52] U.S. Cl................................. 271/156, 198/39
[51] Int. Cl.............................................. B65h 1/08
[58] Field of Search................ 271/36, 39, 40, 62 R

[56] References Cited
UNITED STATES PATENTS

| | | | |
|---|---|---|---|
| 716,983 | 12/1902 | Barber............................... | 271/39 |
| 1,072,846 | 9/1913 | Goodridge........................... | 271/39 |
| 1,213,626 | 1/1917 | Greene................................ | 271/62 R |
| 3,301,551 | 1/1967 | Cassano............................. | 271/39 X |

*Primary Examiner*—Edward A. Sroka
*Attorney*—Henry T. Burke et al.

[57] ABSTRACT

A power transmitting and zero position restoring device for use with a copy sheet feeding apparatus including a magazine with a displaceable bottom plate on which copy sheets are stacked; a rack and pinion arrangement for elevating the bottom plate so that the top sheet of the stack is brought into contact with and removed by a feed roller; an output shaft for operating the elevating pinions; a spring clutch system for communicating a power drive with the output shaft; and a gear system between the spring clutch system and the output shaft for maintaining the bottom plate in the elevated position, when the spring clutch system is disengaged in response to the copy sheet contact with the feed roller, by preventing reverse rotation of the output shaft for a predetermined period. The spring clutch system comprises an annular drive member and juxtaposed driven member, bearingly mounted on the output shaft; a coil spring wound on the outer peripheral surface of the drive and driven members; a control sleeve disposed outwardly of the coil spring; and a ratchet wheel on the control sleeve adapted to be engaged by a pawl member. The clutch system is engaged and disengaged by the respective disengagement and engagement of the ratchet wheel with a pawl connected to the feed roller. The gear system comprises a planetary gear, which interacts with a gear on the driven member and a gear on the output shaft, and a rotatable member on which the planetary gear is mounted. When the rotatable means is fixed, by the engagement of a pawl member with teeth on its outer periphery, driving power is transmitted through the planetary gear from the driven member to the output shaft. Upon disengagement of the clutch by the engagement of the pawl with the ratchet wheel in response to the contact of the feed roller with the copy sheet stack, power transmission ceases and the output shaft is urged to reverse rotation by the weight of the bottom plate and copy cheet stack acting through the rack and pinion arrangement. Reverse rotation of the output shaft is prevented until engagement of the pawl member with the teeth on the rotatable member is released, whereupon rotation of the rotatable member permits the planetary gear to ride over the driven member and output shaft gearing, so that reverse rotation of the output shaft occurs, returning the bottom plate to its initial or zero position in the magazine. Appropriate circuitry is provided with suitable switching which actuates the release of a clutch locking pawl for clutch actuation upon the pushing of an operation button, and which actuates pawl release and rotatable member operation in response to the removal of the top sheet from the copy sheet stack. The clutch disengagement pawl is released upon the reverse rotation of the output shaft and the clutch locking pawl is brought into engagement with the ratchet wheel by coacting with the rotatable member pawl release.

6 Claims, 6 Drawing Figures

United States Patent [19]
Yanagawa
[11] 3,764,129
[45] Oct. 9, 1973
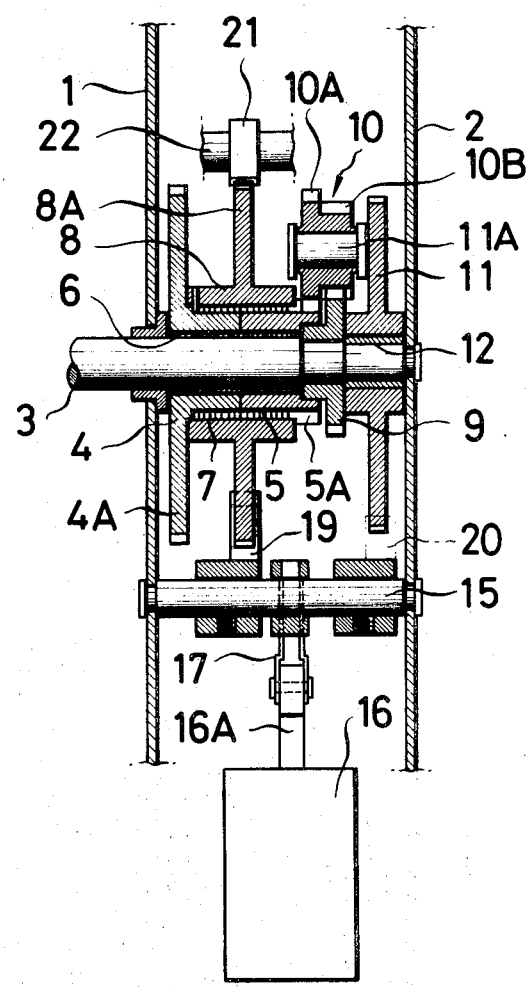

Fig. 5
Fig. 6
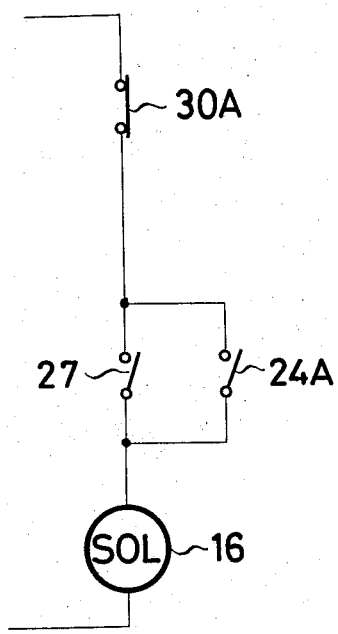
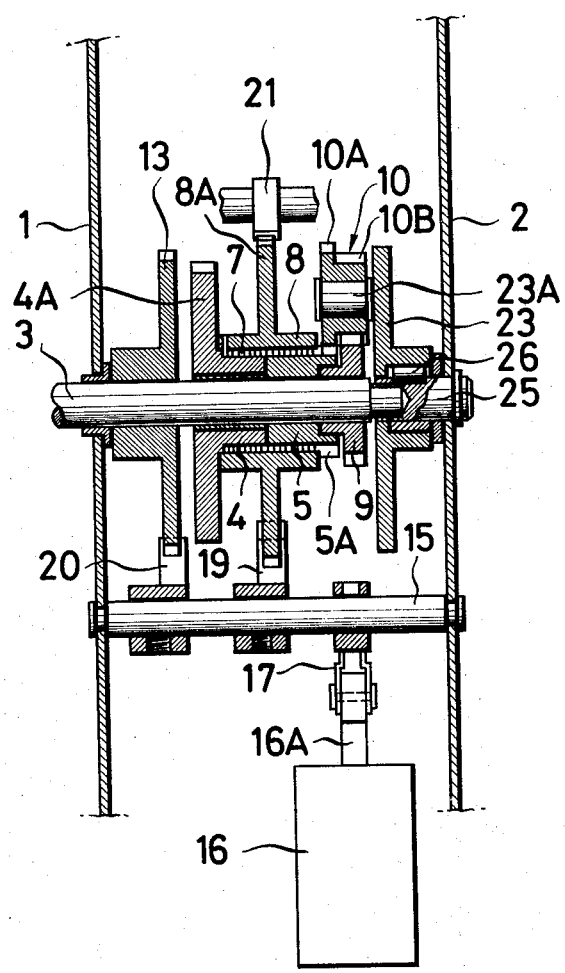

3,764,129

POWER TRANSMITTING AND ZERO POSITION RESTORING DEVICE

BACKGROUND OF THE INVENTION

This invention relates to a device for transmitting power and returning to a zero position after a predetermined time has elapsed.

A device is often needed which is adapted to transmit power upon receipt of a signal, terminate the transmission of power upon receipt of another signal and yet dwell in a position to which it has moved when the transmission of power was terminated, and return to its original position after a predetermined time has elapsed. Copying machines or printing presses are some of the examples in which such a device can have application. A copy sheet feed device for copying machines, for example, operates such that the bottom plate of a copy sheet feed magazine is pushed and moved upwardly each time a print button or repeat means is actuated, so as to bring a stack of copy sheets resting on the bottom plate into engagement with a normally rotating copy sheet feed roller whereby the uppermost copy sheet of the stack of copy sheets may be fed to a duplicating section. After the uppermost copy sheet has been fed, the bottom plate of the copy sheet feed magazine must be restored to its original position and stand by for the next copy sheet feed operation. A device for performing the aforementioned operation could be fabricated using electromagnetic clutches. However, electromagnetic clutches are expensive and consequently a device provided with them in inevitably high in cost.

The present invention provides a device which can perform the aforementioned operation and which is low in cost and reliable in performance.

SUMMARY OF THE INVENTION

This invention utilizes a power transmitting and zero position restoring device comprising clutch means including a drive member, continuously rotated by the drive section of a machine and a driven member provided with a serrated portion; a control mechanism operated from outside for bringing the two clutch members into and out of engagement with each other; planetary gear means including at least one planetary gear provided with a plurality of stepped serrated portions, one of which is adapted to mesh with the serrated portion of the driven member of the clutch means; a rotatable wheel carrying such planetary gear; and an output shaft having secured thereto a gear adapted to mesh with the other serrated portion of the planetary gear. Upon receipt of a signal from outside, the clutch means is engaged and, at the same time, the planetary gear carrying wheel stops rotating, so that rotation of the drive member is transmitted to the output shaft, through the driven member, planetary gear and the gear secured to the output shaft, driving the shaft until the clutch means is disengaged by another signal from outside. Since rotation of the planetary gear carrying wheel is precluded as aforementioned, the output shaft is kept from rotating in the reverse direction when the clutch means is disengaged. This condition lasts until the clutch means, engaged upon receipt of the first signal is disengaged in response to still another signal whereupon the planetary gear carrying wheel is permitted to rotate again.

BRIEF DESCRIPTION OF THE DRAWINGS

Additional applications as well as features and advantages of this invention will become evident from the description set forth hereinafter when considered in conjunction with the accompanying drawings, in which:

FIG. 5 shows an electric circuit used with the device shown in FIGS. 3 and 4; and FIG. 6 is an axial sectional view of an alternate embodiment of the device of this invention.

DETAILED DESCRIPTION OF THE INVENTION

Figure 1:
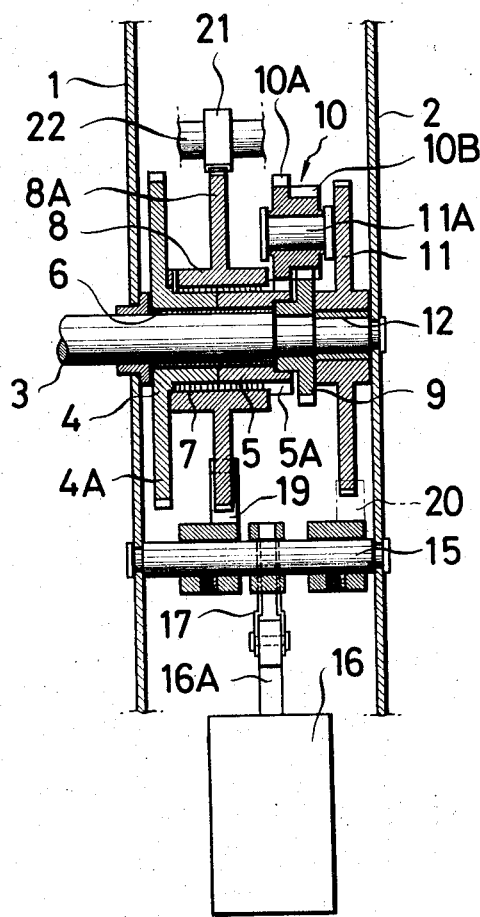
FIG. 1 is an axial sectional view of the device according to this invention.

In FIG. 1, an output shaft 3 is shown rotatably supported by two side plates 1 and 2 disposed parallel to and spaced apart from each other. A drive member 4, adapted to be continuously rotated through a gear 4A by the drive section of a machine (not shown), and a driven member 5 having a serrated portion 5A, are rotatably mounted on the output shaft 3 through a bearing sleeve 6. A coil spring 7, square in cross-sectional shape, is wound on the outer peripheral surfaces of drive member 4 and driven member 5. Provided on the outer side of the coil spring 7 is a control sleeve 8 which is formed integral with a ratchet wheel 8A formed with ratchet teeth on its outer peripheral surface. The coil spring 7 is secured at one end thereof to the driven member 5 and at the other end thereof to the control sleeve 8. The coil spring 7 is, when subjected to no stresses, maintained in light frictional engagement with the outer peripheral surfaces of drive member 4 and driven member 5. The direction in which the coil spring 7 is wound and the direction of rotation of the drive member 4 are interrelated such that, when the control sleeve 8 is free to rotate, rotation of the drive member 4 causes a force to be exerted on the coil spring 7 such that the diameter of coil spring 7 is reduced and the coil spring 7 tightly squeezes the drive member 4 and driven member 5 with an increasingly greater force, thereby drivingly connecting the drive member 4 and driven member 5 together. When rotation of the control sleeve 8 is forcably stopped through engagement of the ratchet wheel 8A, the end of the coil spring 7 secured to the control sleeve 8 also stops rotating, so that frictional dragging of the coils on the rotating drive member 4 subjects the coil spring 7 to a force which acts thereon to increase its diameter, thereby releasing the drive member 4 and the driven member 5 from driving connection with each other. It will be appreciated from the foregoing that the drive member 4, driven member 5, coil spring 7 and control sleeve 8 constitute spring clutch means which operates such that, when the control sleeve 8 stops rotating, the clutch means is disengaged and, when the control sleeve is free to rotate, the clutch means is engaged.

A gear 9 of a diameter greater than that of the serrated portion 5A of driven member 5 is secured to the output shaft 3. A ratchet wheel 11, carrying a planetary gear 10 through a shaft 11A, is mounted on the output shaft 3 through a sleeve 12 which permits relative rotation between them. The planetary gear 10 is maintained in engagement with both the serrated portion 5A of the driven member 5 and the gear 9 by means of stepped serrated portions 10A and 10B; the serrated portion 10A being adapted to mesh with the serrated portion 5A and the serrated portion 10B being adapted to mesh with the gear 9.

Now, if the number of teeth of serrated portion 5A of driven member 5 is assumed to be Z1, the number of teeth of gear 9 is Z2, the number of teeth 10A of serrated portion of planetary gear 10 is Ze and the number of teeth of serrated portion 10B of planetary gear 10 is Z4, and if $$[(Z1/Z3) \cdot (Z4/Z2)] - 1 = c,$$

the ratchet wheel 11 carrying the planetary gear 10 rotates in an opposite direction to the gear 9 when $c>1$ and in the same direction as the gear 9 when $c<1$. The numbers of teeth used on the gears of the present invention may be selected in accordance with either of these two examples. In the embodiment shown in FIG. 1, the numbers of gears are selected such that $c<1$.

Figure 2:
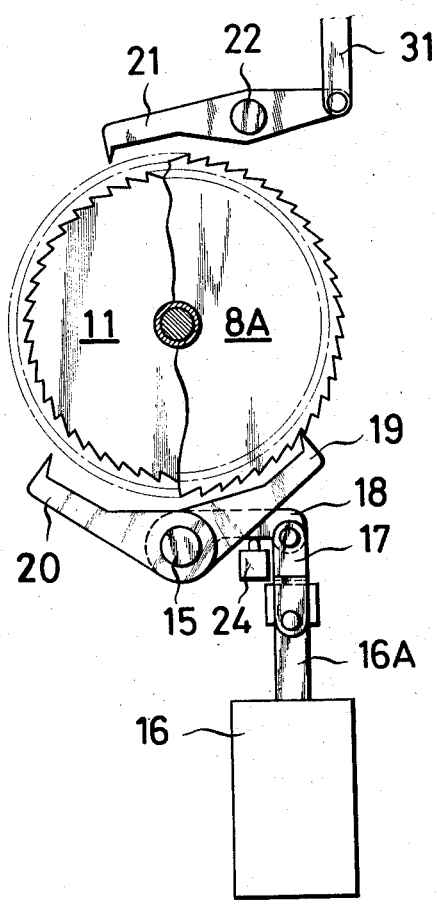
FIG. 2 is a view in explanation of the manner in which two ratchet wheels are engaged by respective pawls for cooperation.

Another shaft 15 is disposed between and rotatably supported by the two side plates 1 and 2. As also shown in FIG. 2, rotation of the shaft 15 is controlled by an actuator 16A of a solenoid 16 through an intermediate link 17 and a lever 18. Two pawls 19 and 20 are secured to the shaft 15; the pawl 19 being adapted to cooperate with the ratchet wheel 8A and the pawl 20 with the ratchet wheel 11. The two pawls 19 and 20 are arranged such that, when the pawl 19 is brought into engagement with the ratchet wheel 8A as shown in FIG. 2, the pawl 20 is released from engagement with the ratchet wheel 11 and, when the pawl 20 is brought into engagement with the ratchet wheel 11, the pawl 19 is released from engagement with the ratchet wheel 8A. Disposed to cooperate with the ratchet wheel 8A as shown in FIG. 2 is another pawl 21 which is pivotally supported by a shaft 22 and adapted to be controlled as will subsequently be more fully described, by signals from outside or signals produced by the movements of the copy sheet feed arm of the copy sheet feed device, for example, to come into and out of engagement with the ratchet wheel 8A. 24 is a holding switch for the solenoid 16.

A preferred embodiment of the device of the present invention for incorporation in the copy sheet feed device of a copying machine will now be described.

Figure 3:
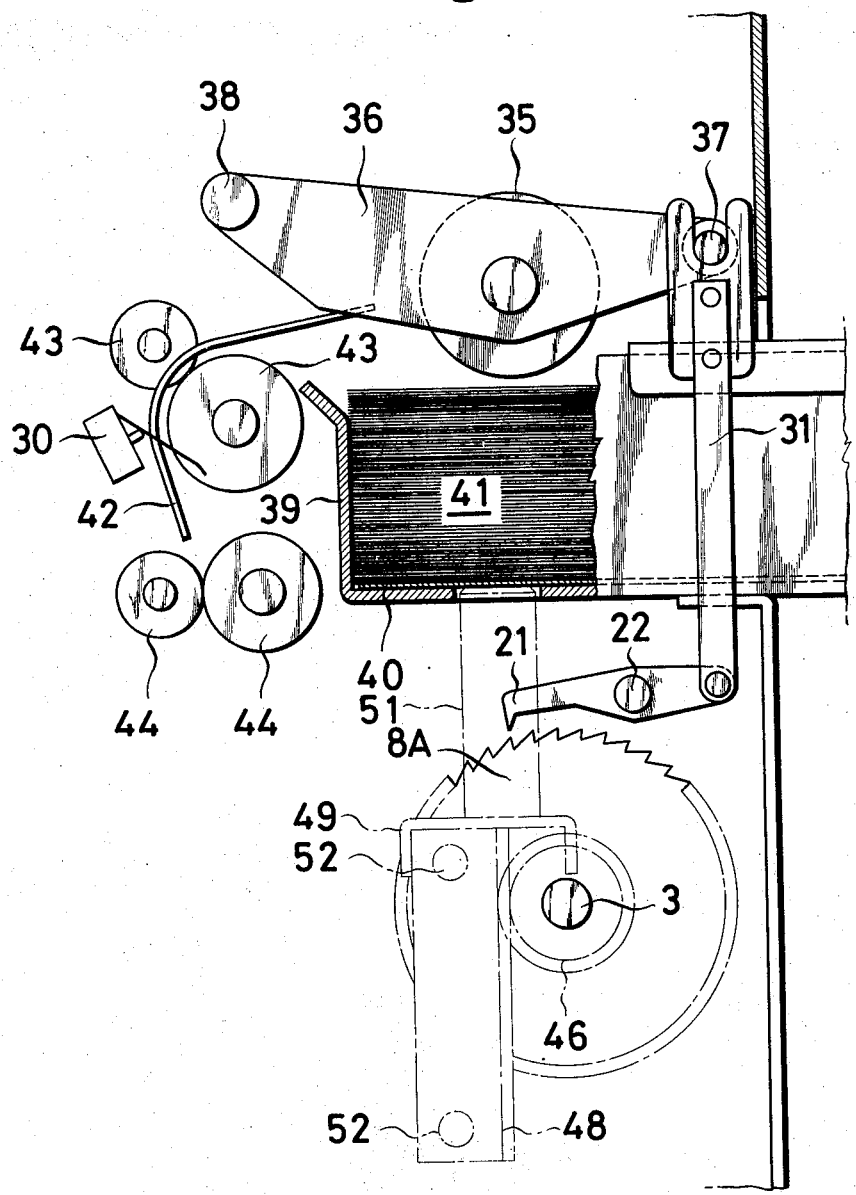
FIG. 3 is a view in explanation of the application of the device in a copy sheet feed device for a copying machine.

In FIG. 3, a control rod 31 (pivotally connected at its lower end to the opposite end of the pawl 21 adapted to cooperate with the ratchet wheel 8A of control sleeve 8) supports at its upper end a pin 37 attached to one end of a copy sheet feed arm 36 for a copy sheet feed roller 35. The copy sheet feed arm 36 is pivotally supported at the other end thereof by a shaft 38 connected to the frame of the copying machine. A stack 41 of copy sheets is piled on a bottom plate 40 in a suitable magazine 39. There is a clearance between the copy sheet feed roller 35 and the uppermost copy sheet of the stack 41 when the bottom plate 40 is not lifted to assume its upper position and the copy sheet feed roller 35 is disposed in its lowermost position. With the roller in this position, the pawl 21 is out of engagement with the ratchet wheel 8A. If the bottom plate 40 is lifted and the uppermost copy sheet of the stack 41 of copy sheets is brought into contact with the copy sheet feed roller 35, then the copy sheet feed roller 35 is slightly lifted and causes the pawl 21, through the pin 37 and control 31, to move in pivotal motion about the shaft 22, which is connected to the machine frame, into engagement with the ratchet wheel 8A. 42 is a guide plate for guiding the copy sheet fed; 43 and 44 are sheet delivery rollers; and 30 is a sheet leading end detecting switch.

Figure 4:
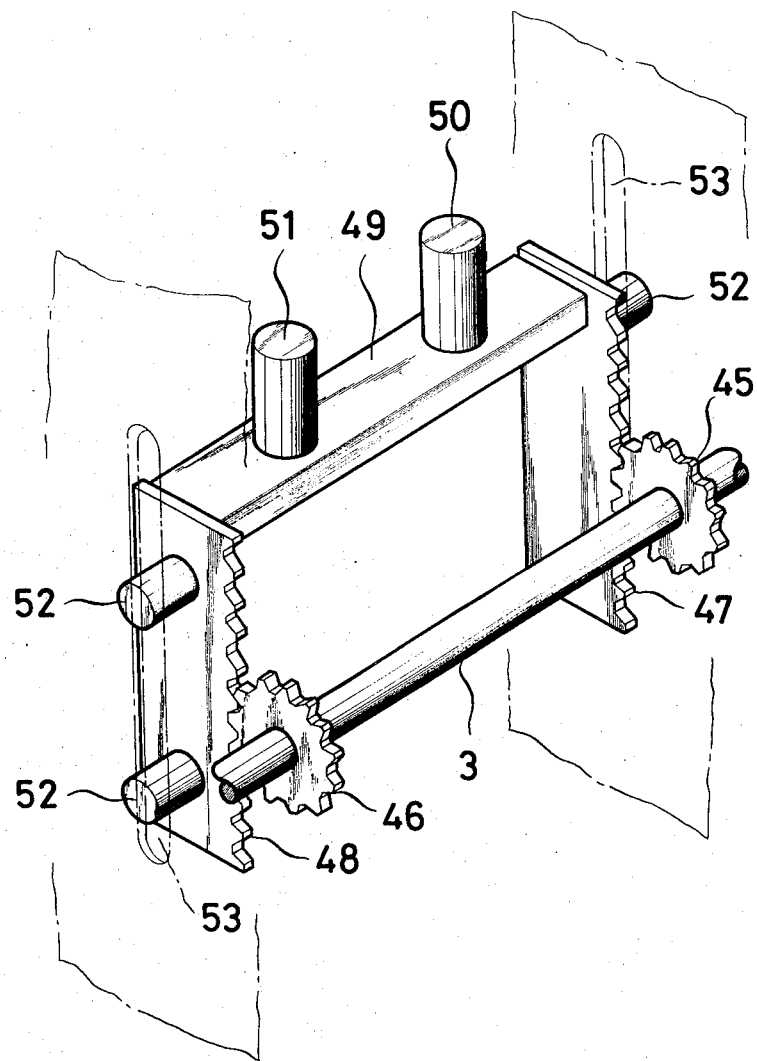
FIG. 4 is a fragmentary perspective view of the device shown in FIG. 3.

As shown specifically in FIG. 4, two pinions 45 and 46 are mounted on an extension of the output shaft 3 in spaced-apart relationship for meshing engagement with two vertical racks 47 and 48 respectively, which are part of means for lifting the bottom plate 40 in the copy sheet feed magazine 39. The two racks 47 and 48 are interconnected by a cross bar 49 which carries thereon supports 50 and 51 which, as shown in FIG. 3, extend through an opening formed in the bottom of magazine 39 to engage the bottom plate 40. The two racks 47 and 48 are guided in their vertical movement by horizontal pins 52 secured to the racks 47 and 48 and received in vertically disposed slots 53 formed in the machine frame.

In operation, the drive member 4 of the power transmission and zero position restoring device shown in FIG. 1 is rotated at all times through its gear 4A by the drive section of the machine. The solenoid 16 is normally de-energized, so that the pawl 19 is maintained in engagement with the ratchet wheel 8A and the pawl 20 is maintained out of engagement with the ratchet wheel 11 as shown in FIG. 2. The pawl 21 is out of engagement with the ratchet wheel 8A as shown in FIGS. 2 and 3.

When the print button of the copying machine is depressed, a contact 27, shown in FIG. 5, which is connected to the print button is closed, closing a circuit containing solenoid 16, thus energizing the solenoid 16. A contact 30A of the detection switch 30 also contained in the circuit is normally closed. When the solenoid 16 is energized, the actuator 16A is moved downwardly as seen in FIG. 2 and the shaft 15 is rotated in a clockwise direction in the figure through the intermediate link 17 and lever 18. This action causes the pawl 19 to be released from engagement with the ratchet wheel 8A and the pawl 20 to be brought into engagement with the ratchet wheel 11, thereby permitting the control sleeve 8 to rotate. This results in the drive member 4 and driven member 5 being rotatingly connected to each other as aforementioned, as that the rotation of the drive member 4 is transmitted to the output shaft 3 through the driven member 5, the planetary gear 10, and the gear 9 secured to the output shaft 3. The ratchet wheel 11 does not rotate in this case because it is engaged and held in place by the pawl 20, so that the planetary gear 10 only rotates on its own axis about the shaft 11A.

When the solenoid 16 is energized and the actuator 16A is moved downwardly as seen in FIG. 2, the lever 18 is caused by the intermediate link 17 to move pivotally in a clockwise direction, thereby actuating the switch 24 and closing a contact 24A which is connected in parallel in the circuit with the contact 27 as shown in FIG. 5. Closure of the contact 24A keeps the solenoid 16 energized even if the hand of the operator is released from the print button.

When the output shaft 3 rotates as aforementioned, then the bottom plate 40 is lifted through the action of the pinions 45 and 46, racks 47 and 48 in meshing engagement with the pinions, cross bar 49 and supports 50 and 51. This brings the uppermost copy sheet of the stack 41 resting on the bottom plate 40 into contact with the continuously rotating copy sheet feed roller 35 which feeds the uppermost copy sheet to the duplicating section. At this time, the copy sheet feed roller 35 is moved slightly upwardly, so that the copy sheet feed arm 36 moves pivotally about the shaft 38 and the control rod 31 carrying the pin 37 attached to the other end of the copy sheet feed arm 36 also moves upwardly. As a result, the pawl 21 moves pivotally in counterclockwise direction about the shaft 22 into engagement with the ratchet wheel 8A so as to thereby cause the control sleeve 8 to stop rotating. This results in the clutch means being disengaged, releasing the drive member 4 and driven member 5 from rotating interconnection, so that the output shaft 3 stops rotating and the operation of lifting the bottom plate 40 is terminated. At this time, the downward movement by gravity of the stack 41, bottom plate 40 and lifting means, and consequently the reverse rotation of the pinions 45 and 46 and output shaft 3, is precluded by the operation presently to be described.

The driven member 5, which is in engagement with the control sleeve 8 whose rotation is stopped by the ratchet pawl 21, also is rendered inoperative by virtue of its engagement with the control sleeve 8 through the coil spring 7. The gear 9, secured to the shaft 3 which is under a force tending to reversely rotate it, in turn tends to cause the planetary gear 10 to rotate. However, rotation of the planetary gear 10 about the serrated portion 5A, which remains stationary, is precluded by the engagement of the pawl 20 with the ratchet wheel 11. Reverse rotation of the output shaft 3 is thus precluded and consequently the copy sheet feed roller 35 is maintained in contact with the stack of copy sheets 41.

When the uppermost copy sheet fed by the copy sheet feed roller 35 is nipped by the pair of delivery rollers 43 and the leading end thereof actuates the switch 30, the normally closed contact 30A shown in FIG. 5 is opened, thereby de-energizing the solenoid 16. This restores the control lever 18 to its position shown in FIG. 2, so that the pawl 20 is released from engagement with the ratchet wheel 11 and the pawl 19 is brought into engagement with the ratchet wheel 8A. At this time, reverse rotation of the output shaft 3 caused by the weight of the copy sheet feed device is made possible through the gear 9 by rotation of the planetary gear 10 about the shaft 11A. The serrated portion 10A of planetary gear 10 moves along the serrated portion 5A of driven member 5 which remains stationary. Similarly, the ratchet wheel 11 is released from engagement with the pawl 20 and rendered free to rotate. Reverse rotation of the output shaft 3 is terminated when the bottom plate 40 is restored to its original position.

A modification is shown in FIG. 6 wherein a wheel 23 (corresponding to 11 in the embodiment of FIG. 1) carrying a support shaft 23A of the planetary gear 10 is mounted through a one-way clutch 26 on a fixed shaft 25 which is an entity different from the output shaft 3. The fixed shaft 25 which is secured at one end to the side plate 2 slidably supports at its free end the output shaft 3. A ratchet wheel 13 is secured to the end portion of output shaft 3 at the side of side plate 1 and adapted to be engaged by the ratchet pawl 20 shown in FIG. 2.

The embodiment shown in FIG. 6 is similar to the embodiment shown in FIG. 1 in that, when the pawl 19 is out of engagement with the ratchet wheel 8A, power is transmitted to the output shaft 3 through the drive member 4, rotated by the drive section of the machine at all times, and the coil spring 7, driven member 5, planetary gear 10, and gear 9 secured to the output shaft 3. In this case, rotation of the wheel 23 is precluded by the one-way clutch 26 and the planetary gear 10 only rotates about the support shaft 23A. Although the pawl 20 comes into engagement with the ratchet wheel 13 at this time, the former is unable to prevent rotation of the latter because the engagement that takes place is not in a direction in which rotation of ratchet wheel 13 is prevented, so that the ratchet wheel 13 and output shaft 3 are rendered free to rotate.

Reverse motion of the bottom plate 40, stock of copy sheets 41 and other elements by gravity is precluded by the engagement of the pawl 20 with the ratchet wheel 13.

The bottom plate 40 and other elements are restored to their original positions when the wheel 23 is rotated through the output shaft 3, gear 9 secured to the output shaft 3, and planetary gear 10. At this time, the pawl 20 is released from engagement with the ratchet wheel 13 and the pawl 19 is brought into engagement with the ratchet wheel 8A, so that the ratchet wheel 13 is free to rotate and rotation of the control sleeve 8, and hence the driven member 5, is precluded. The planetary gear 10 rotates about the support shaft 23A and around the serrated portion 5A of driven member 5 which remains stationary. By suitably selecting the ratios of the number of teeth of serrated portion 5A of driven member 5 and the number of teeth of gear 9 to the numbers of teeth of serrated portion 10A and 10B of planetary gear 10 respectively as aforementioned, it is possible to permit the wheel 23 to rotate in a direction in which the one-way clutch is disengaged.

What is claimed is:

1. A copy sheet feed apparatus for use in copying machines comprising:
   a. a copy sheet magazine having a displacable bottom plate therein on which copy sheets are stacked;
   b. means for removing the top sheet from the copy sheet stack;
   c. means for raising said bottom plate within said magazine to feed the top sheet of the stack to the removing means;
   d. a source of driving power;
   e. clutch means for connecting said driving power source to said raising means;
   f. means for actuating said clutch means;
   g. means for deactivating said clutch means in response to the engagement of the removing means with the top copy sheet;
   h. means for maintaining the bottom plate in the raised position upon deactivation of the clutch means; and
   i. means for releasing the bottom plate maintaining means in response to the removal of a copy sheet from the stack to permit the bottom plate to return to the bottom of the magazine.

2. Apparatus as in claim 1 wherein said clutch means comprises:
   j. driven means having first gear means thereon;

k. engaging means for operatively coupling said source of driving power and said driven means to supply driving power to said driven means;
l. second gear means on said raising means; and
m. third gear means for coupling said first and second gear means to transmit driving power to said raising means from said driven means when said engaging means is engaged.

3. Apparatus as in claim 2 wherein said third gear means comprises:
n. a planetary gear having:
  i. a first set of teeth engaging said first gear means; and
  ii. a second set of teeth engaging said second gear means;
and wherein said means for maintaining the bottom plate in the raised position comprises:
o. a rotatable member on which said third gear is mounted for transmitting the driving force between said first and second gear means when said bottom plate maintaining means is fixed and for riding over said first and second gear means when said rotatable member rotates.

4. Apparatus as in claim 2, wherein said releasing means comprises:
p. a solenoid having an operator reciprocable between two positions;
q. pivoting means connected to said operator; and
r. a first pawl on said pivoting means for locking said clutch means when said operator is in one of the two positions;
and wherein said bottom plate maintaining means comprises:
s. a second pawl on said pivoting means for engaging said rotatable member when said operator is in the other of the two positions.

5. Apparatus as in claim 4 wherein said source of driving power and said driven means comprise matching sleeve-like portions and wherein said engaging means comprises:
t. a coil spring wound on the outer peripheral surface of said sleeve-like portions; and
u. a control sleeve disposed outwardly of said coil spring having a ratchet wheel provided on its outer-peripheral surface with teeth adapted to be engaged by at least one of said pawls whereby said control means can be engaged and disengaged.

6. Apparatus as in claim 5 wherein said clutch deactivating means comprises: a third pawl which engages the teeth of said ratchet wheel, said third pawl being normally maintained in engagement with the ratchet wheel and being released from engagement therewith for engaging said clutch means.

* * * * *